United States Patent [19]
Umeda et al.

[11] Patent Number: 5,952,749
[45] Date of Patent: Sep. 14, 1999

[54] COOLING ARRANGEMENT OF ALTERNATOR

[75] Inventors: Atsushi Umeda, Okazaki; Tsutomu Shiga, Nukata-gun; Shin Kusase, Obu, all of Japan

[73] Assignee: Denso Corporation, Kariya, Japan

[21] Appl. No.: 09/084,213

[22] Filed: May 26, 1998

[30] Foreign Application Priority Data

May 26, 1997 [JP] Japan .................. PCT/JP97/01778
Feb. 13, 1998 [JP] Japan .................. 10-049039

[51] Int. Cl.⁶ ........................................... H02K 9/04
[52] U.S. Cl. .............................. 310/63; 310/180
[58] Field of Search .................. 310/58, 59, 62, 310/63, 60 A, 180

[56] References Cited

U.S. PATENT DOCUMENTS

| | | | |
|---|---|---|---|
| 1,822,261 | 9/1931 | Apple | 310/201 |
| 2,928,963 | 3/1960 | Bertsche | 310/168 |
| 3,749,953 | 7/1973 | Baumann et al. | 310/62 |
| 4,082,344 | 4/1978 | Anderson | 296/190.05 |
| 4,265,596 | 5/1981 | Katagiri et al. | 416/236 A |
| 4,870,307 | 9/1989 | Kitamura et al. | 310/54 |
| 5,093,591 | 3/1992 | Kitamura et al. | 310/62 |
| 5,097,167 | 3/1992 | Kanayama et al. | 310/201 |
| 5,691,590 | 11/1997 | Kawai et al. | 310/180 |
| 5,710,467 | 1/1998 | Irie et al. | 310/64 |
| 5,742,498 | 4/1998 | Taniguchi | 363/145 |

FOREIGN PATENT DOCUMENTS

| | | |
|---|---|---|
| 671 801 | 9/1995 | European Pat. Off. . |
| 3704780 | 11/1988 | Germany . |
| 40 31 276 | 4/1992 | Germany . |
| B2-48-442 | 1/1973 | Japan . |
| A-50-47102 | 4/1975 | Japan . |
| 59-159638 | 9/1984 | Japan . |
| A-59-159638 | 9/1984 | Japan . |
| A-62-272836 | 11/1987 | Japan . |
| A-63-274335 | 11/1988 | Japan . |
| A-64-5340 | 1/1989 | Japan . |
| A-3-159549 | 7/1991 | Japan . |
| 7-46795 | 2/1995 | Japan . |
| A-7-303351 | 11/1995 | Japan . |
| A-8-205441 | 8/1996 | Japan . |
| A-8-298756 | 11/1996 | Japan . |
| 84/01478 | 4/1984 | WIPO . |
| 92/06527 | 4/1992 | WIPO . |

OTHER PUBLICATIONS

*Patent Abstracts of Japan*, vol. 095, No. 005, Jun. 30, 1995.
*Patent Abstracts of Japan*, vol. 009, No. 010 (E–290), Jan. 17, 1985.

Primary Examiner—Nestor Ramirez
Assistant Examiner—Judson H. Jones
Attorney, Agent, or Firm—Pillsbury Madison & Sutro LLP

[57] ABSTRACT

An alternator disposed in the engine compartment of a vehicle is composed of a rotor having magnetic poles and a field coil, a cooling fan member, a stator disposed around the rotor and having a stator core and a multi-phase stator winding. The multi-phase stator winding has a plurality of conductor segments each having a U-turn portion to form a first coil-end group and a pair of joint portions to form a second coil-end group. The first coil-end group is disposed where temperature is higher than the other end, and the second coil-end group is disposed on the other end. The cooling fan member sends less cooling air to the second coil-end group than the first coil-end group.

14 Claims, 5 Drawing Sheets

COOLING ARRANGEMENT OF ALTERNATOR

CROSS REFERENCE TO RELATED APPLICATION

The present application is based on and claims priority from PTC/JP97/01778 filed on May 26, 1997 and Japanese Patent Application 10-49039 filed on Feb. 13, 1998, the contents of which are incorporated herein by reference.

BACKGROUND OF THE INVENTION

1. Field of the Invention

The present invention relates to an alternator driven by an internal combustion engine for a passenger car, a truck or a boat.

2. Description of the Related Art

Recently, installation of various safety control systems have necessitated an increase in the output power of an alternator. On the other hand, as engine noises have been reduced to comply with the social demand for noise reduction in vehicles, noises of an engine accessories such as an alternator has come into question.

Noises of the alternator are mainly caused by cooling air blowing on uneven coil-end groups or portions of the stator winding.

JP-A-59-159638 discloses an alternator which has a rotor with cooling fans and a stator with a multi-phase stator winding wound by a continuous wire. The stator winding has flattened coil-end groups to increase the surface area to be cooled by the flow of the cooling air.

However, coil-end groups of the multi-phase stator winding wound by a continuous wire are necessarily formed unevenly because each phase winding interferes with each other in the circumference thereof. Thus, cooling air blows on the uneven inside structure, thereby generating noises.

WO92/06527 discloses an alternator in which U-shaped conductors having a U-turn portion are inserted into respective slots of a stator core from a certain direction. Each of the ends opposite the U-turn portion of the U-shaped conductors are, thereafter, connected to form a stator winding. Thus, the stator winding has a coil-end group including the U-turn portions and a coil-end group including the joint portions. The U-shaped conductors are disposed even in the slots, and the space factor of the conductors in the slot becomes high and the output power can be increased.

While the coil-end group having the U-turn portions conductors form even air-passages, the coil end groups having joint portions form walls on which cooling air blows on to increase noise. However, no specific cooling structure to reduce noises is shown therein.

SUMMARY OF THE INVENTION

An object of the present invention, in view of the above problems, is to provide an improved alternator for a vehicle which can increase output power without increasing noises.

In order to attain the above object, the stator winding of an alternator according to the present invention includes a first coil-end group having a plurality of U-turn portions disposed at an end of a stator core and a second coil-end group having a plurality of joint portions disposed at the other end of the stator core, a cooling member for sending less cool air to the second coil-end group than the first coil-end group, thereby suppressing air-blow noises.

It is also desirable that the first fan for cooling the first coil-end group is a centrifugal fan, and the second cooling fan for cooling the second coil-end group is a mixed-flow fan.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE A PREFERRED EMBODIMENT

Figure 1:
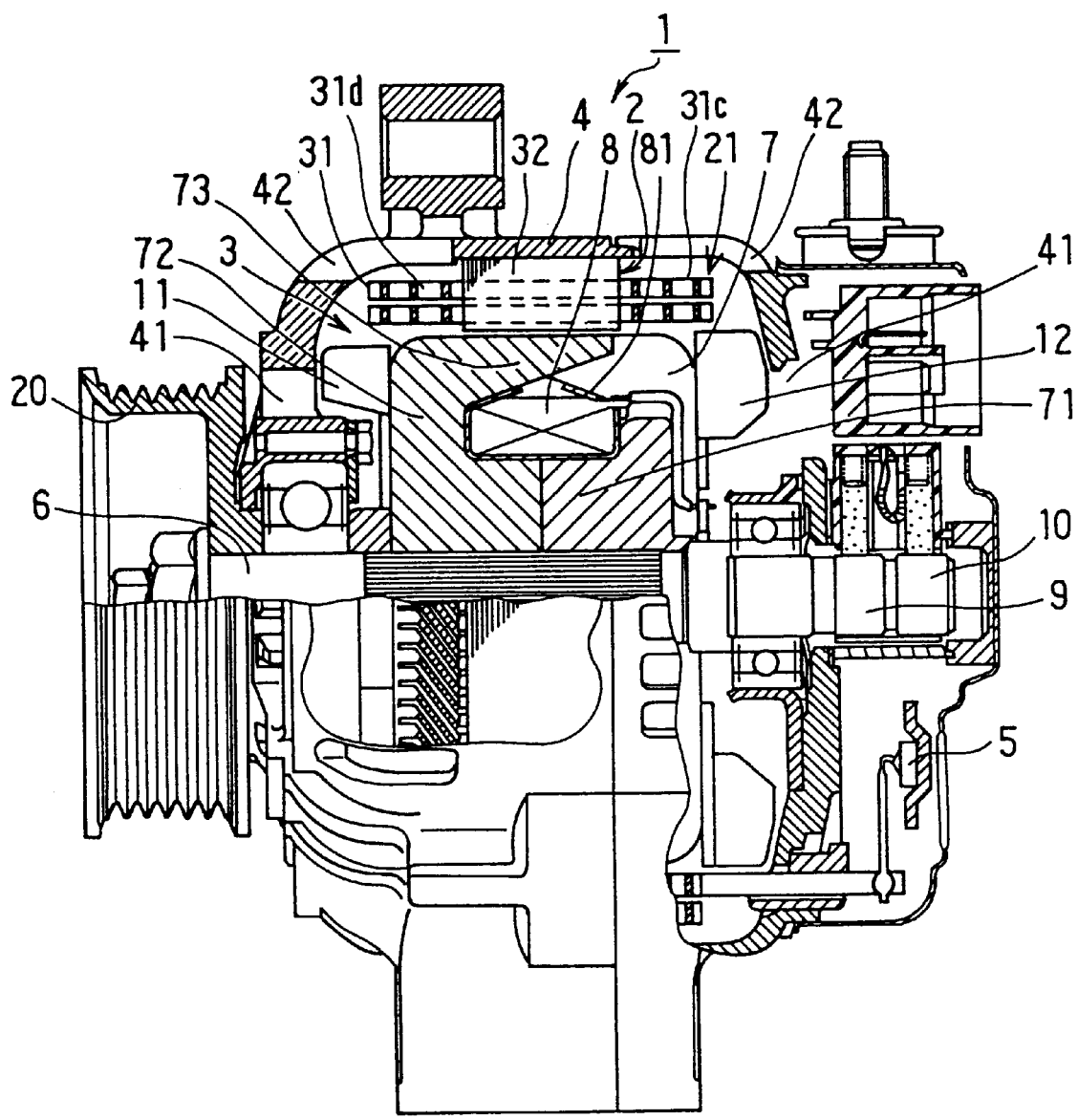
FIG. 1 is a cross-sectional view illustrating an alternator for a vehicle according to a preferred embodiment.

An alternator for a vehicle according to a preferred embodiment of the present invention is described with reference to FIGS. 1–7.

Alternator 1 is mounted in an engine compartment of a vehicle and is composed of stator 2, rotor 3, frame 4 supporting stator 2 and rotor 3 and rectifier 5 converting ac power to dc power.

Rotor 3 is composed of pole core 7, field coil 8, slip rings 9, 10, mixed-flow type cooling fan 11 and centrifugal cooling fan 12. Shaft 6 is connected with pulley 20 and driven by an engine (not shown) mounted on a vehicle to rotate rotor 3. Pole core 7 is composed of a pair of core members. Pole core 7 has boss portion 71 fitted to shaft 6, desk portion 72 extending radially outward from boss portion 71 and a plurality of claw poles 73. Field coil 8 is held at a suitable pressure by the inner periphery of claw poles 73 via insulating member 81. Insulating member 81 is a resin-impregnated sheet, which is heated and bonded to field coil 8 to insulate field coil from pole core 7.

Mixed-flow fan 11 is fixed to the front end of disk portion 72 near pulley 20 and centrifugal fan 12 is fixed to the rear end of disk portion 72 respectively. Mixed-flow fan 11 has blades whose projected area (the area of the blade projected in the rotating direction) is smaller than the projected area of blades of centrifugal fan 12. The outside diameter of mixed-flow fan 11 is smaller than the outside diameter of centrifugal fan 12. The distance between mixed-flow fan 11 and the corresponding second coil-end group 31d is longer than the distance between centrifugal fan 12 and the corresponding first coil-end group 31c. The number of the blades of centrifugal fan 12 is not less than the number of mixed-flow fan 11. Frame 4 has air discharge windows 42 at portions corresponding to coil-end groups 31 of stator winding 21 and air intake windows 41 at the axially opposite ends thereof.

Figure 3:
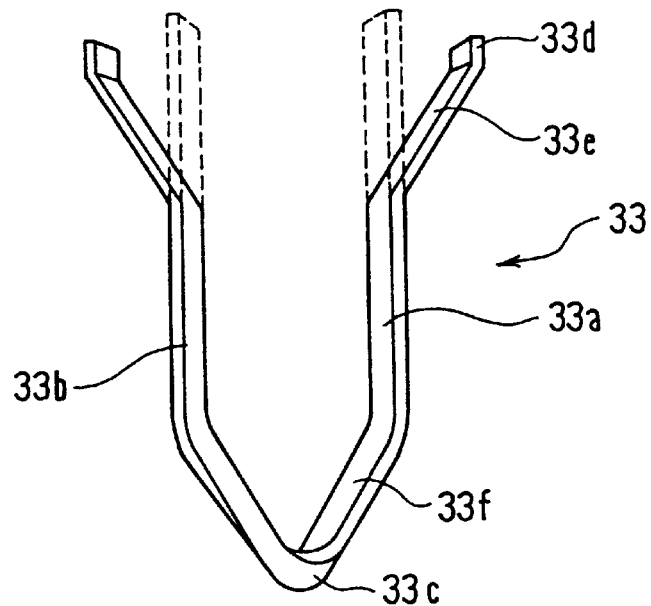
FIG. 3 is a perspective view illustrating a conductor segment according to the embodiment.
Figure 5:
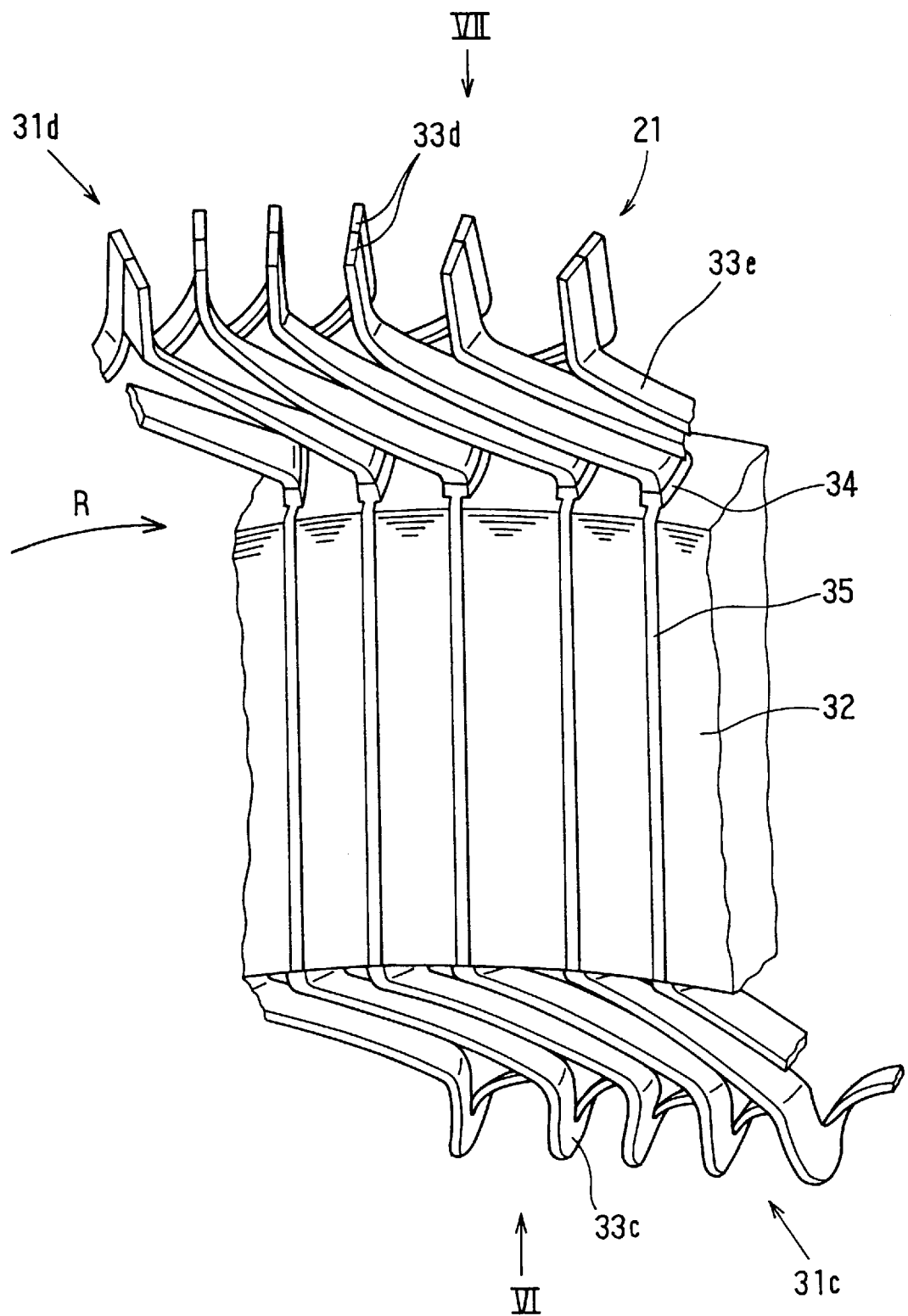
FIG. 5 is a perspective view illustrating coil-end portions on the opposite ends of the stator according to the embodiment.

Stator 2 is supported by frame 4 and is composed of stator core 32, stator winding 21 formed from conductor segments 33 and insulator 34 for insulating conductor segments 33 from stator core 32. Stator core 32 is composed of laminated steel sheets and has a plurality of slots 35. Stator winding 21 is composed of U-shaped conductor segments 33 made of copper having a rectangular cross-section, as shown in FIGS. 3 and 5. Conductor segments 33 are formed from copper plate by a press machine into a U-shape and inserted into slots 35 so that the opposite surfaces of conductors can be fitted to generally parallel walls of the slots via insulator 34. Each of conductor segments 33 is connected to corresponding one of conductor segments 33. Each of U-shaped conductor segments 33 has inner conductor 33a, outer conductor 33b, U-turn portion 33c, joint portion 33d and inclined portions 33e, 33f.

Figure 4:
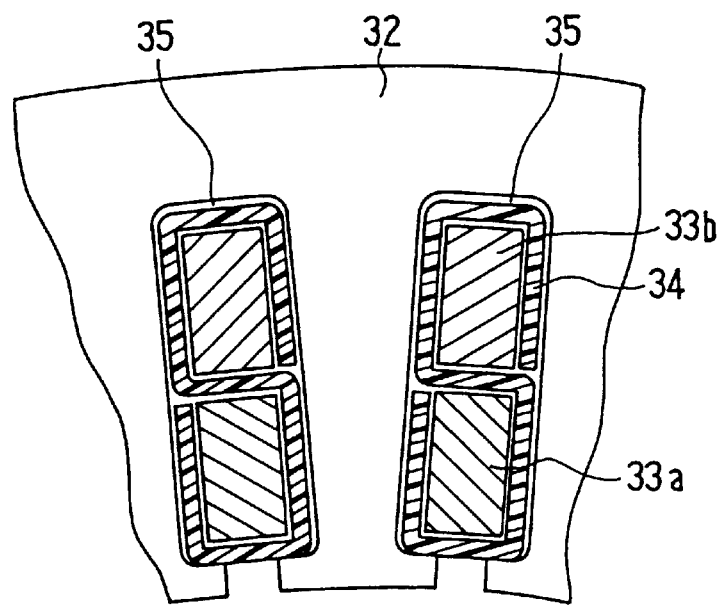
FIG. 4 is a fragmentary view illustrating a portion of the stator according to the embodiment.

Conductor segments 33 are fixed to stator core 32 as follows: Each of U-turn portions 33c is disposed on the same axial end of stator core 32; each of outer conductors 33b is inserted into the rear side of one of slots 35; each of inner conductors 33a is inserted into the front side of one of slots 35; each of a pair of joint portions 33d is bent to be inclined outward; each of joint portions 33d in one of the front and rear sides of slots 35 is blazed or welded by a welder, such as ultrasonic welder or arc welder, to one of joint portions of conductor segment 33 in the other of the front and rear sides of slots 35 as shown in FIG. 2; and a pair of bare conductor segments 33 in both the front and rear sides of slots 35 are insulated by S-shaped insulator 34 as shown in FIG. 4.

Figure 2:
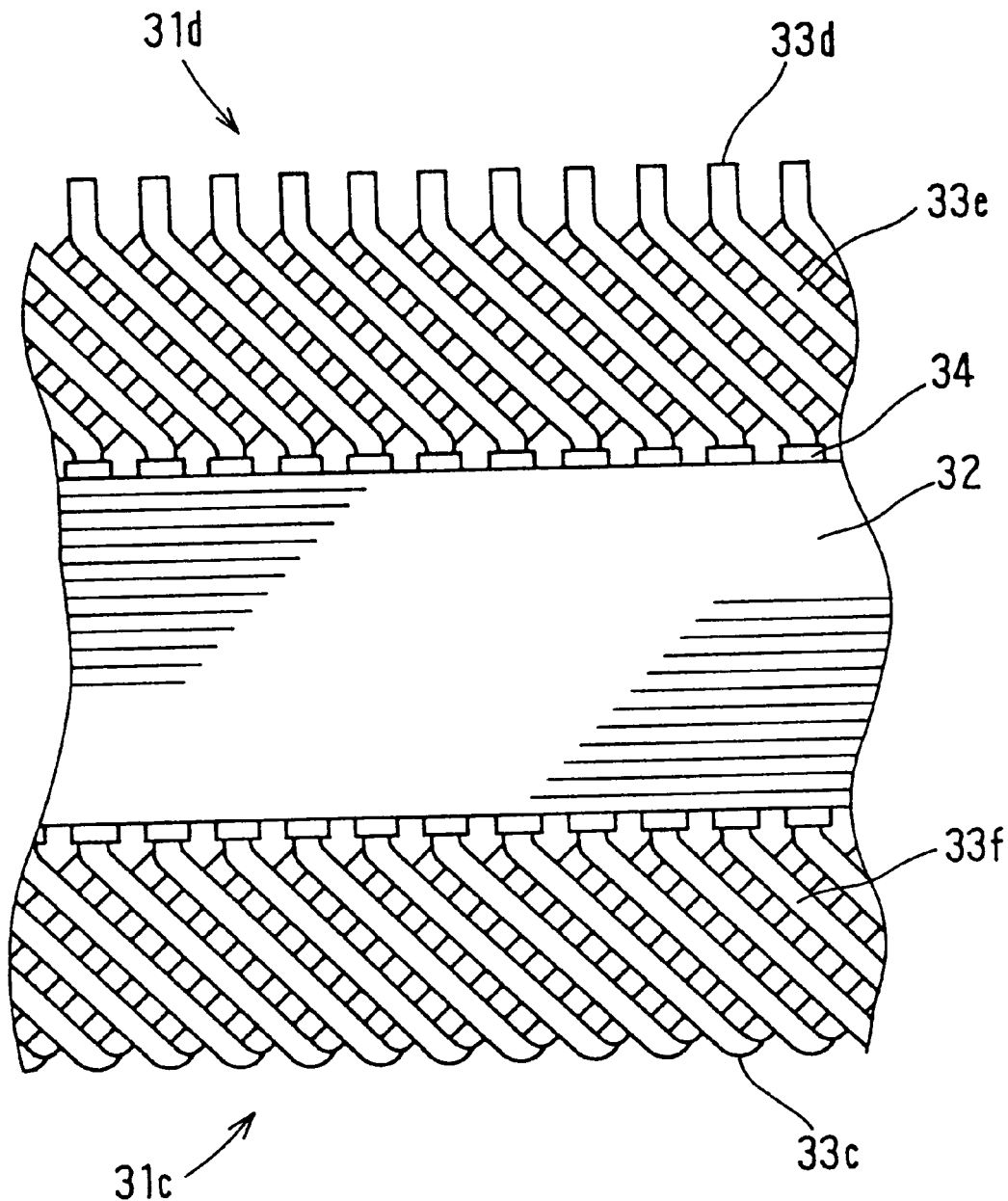
FIG. 2 is a plan view of a stator according to the embodiment.

As shown in FIG. 2, inclined portions 33e, 33f of conductor segment 33 are inclined in opposite directions at a certain angle so that a plurality of phase-windings can be disposed without interference. Thus, first coil-end group 31c is disposed on the side opposite the pulley 20 (rear side) and second coil-end group 31d is disposed on the side of pulley 20 (front side). Conductor segment 33 may be coated with insulating material.

Centrifugal fan 12 is rotated by rotor 3 to send air from air-intake windows 41 radially outward to first coil-end group 31c and discharged from air-discharge window 42 to the outside of frame 4.

On the other hand, mixed-flow fan 11 sends the air from air-intake windows 41 both in a radially outward direction and axial direction to blow on both coil-end group 31d and field coil 8, and goes out of frame 4 from air discharge windows 42.

The outside diameter of centrifugal fan 12 is larger than the outside diameter of mixed-flow fan 11, and the quantity of cooling air sent to second coil-end group 31d by mixed-flow fan 11 is smaller than the quantity of the cooling air sent to first coil-end group 31c by centrifugal fan 12.

Figure 6:
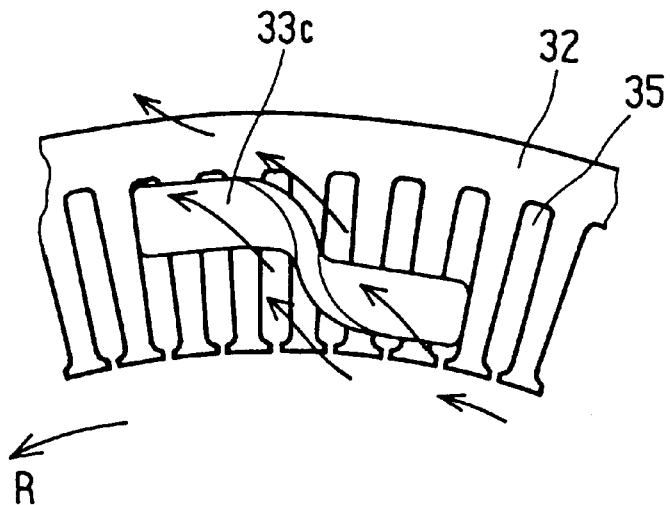
FIG. 6 is a view viewed from a portion indicated by arrow VI in FIG. 5.
Figure 7:
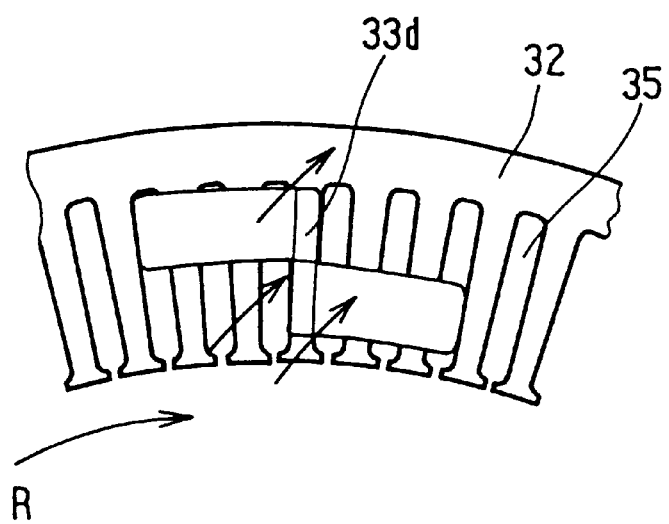
FIG. 7 is a view viewed from a portion indicated by arrow VII in FIG. 5.

The cooling air flows along the inclined outer periphery of U-turn portion of first coil-end group 31c as shown in FIG. 6. On the other hand, the cooling air is blocked by joint portions 33d of second coil-end group 31d as shown in FIG. 7. That is, as indicated by the arrows representing the cooling air flow in FIG. 7, the joint portion at least interrupts the cooling air flow.

As stated above, the quantity of the cooling air sent to second coil-end group 31d is smaller than the quantity of the cooling air sent to first coil-end group 31c, and the speed of cooling air sent to second coil-end group 31d is lower than the speed of the cooling air sent to first coil-end group 31c. Thus, the interference noises on second coil-end group 31d can be reduced. As illustrated in FIG. 5, gaps are formed between adjacent inclined portions 33e of second coil-end group 31d so that the cooling air can pass through the gaps, thereby cooling second coil-end groups 31d effectively. Thus, the noise caused by the air blow on second coil-end group 31d is suppressed.

Because temperature of the air around pulley 20 and second coil-end group 31d (front side of the alternator) is lower than the temperature of the air around the rear side and first coil-end group 31c (rear side of the alternator) in the engine compartment, the above arrangement equalizes the temperature of first and second coil-end groups 31c, 31d effectively.

In the above embodiment, the shape, outside diameter, projected area of the blades, the number of the blades and the distance between the coil-end group and the cooling fan are differentiated from each other between the front side fan and rear side fan. However, it is not necessary to employ all the above features in order to reduce the noises of the cooling air. It is only necessary to make the quantity or the speed of the cooling air blowing on second coil-end group 31d lower than that on first coil-end group 31c.

One or both of cooling fans 11, 12 can be disposed outside the frame 4. Mixed-flow fan 11 can have only axial-flow blades or axial-and-centrifugal-mixed-flow blades.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An alternator disposed in the engine compartment of a vehicle comprising:
    a rotor having magnetic poles and a field coil,
    a cooling fan member, and
    a stator disposed around said rotor and having a stator core and a multi-phase stator winding, wherein
        said multi-phase stator winding comprises a plurality of conductor segments each having a U-turn portion to form a first coil-end group and a pair of joint portions to form a second coil-end group;
        said first coil-end group is disposed on an end of said stator core so as to define a continuous cooling air passageway and said second coil-end group is disposed on the other end so as to define a cooling air passageway in which said joint portions form interruptions to the flow of said cooling air; and
        said cooling fan member sends less cooling air to said second coil-end group than said first coil-end group.

2. An alternator for a vehicle as claimed in claim 1, wherein
    said cooling member comprises a first fan for cooling said first coil-end group and a second fan for cooling said second coil-end group.

3. An alternator for a vehicle as claimed in claim 2, wherein
    said first fan is disposed on an end of said rotor corresponding to said first coil-end group and said second fan is disposed on the other end of said rotor corresponding to said second coil-end group.

4. An alternator for a vehicle as claimed in claim 3, wherein
    outside diameter of said first fan is larger than outside diameter of said second fan.

5. An alternator for a vehicle as claimed in claim 3, wherein
    the projected area of the blade of said first fan is larger than the projected area of the blade of said second fan.

6. An alternator for a vehicle as claimed in claim 3, wherein said first fan is a centrifugal fan, and said second fan is a mixed-flow fan.

7. An alternator for a vehicle as claimed in claim 3, wherein the distance between said first fan and said first coil-end group is shorter than the distance between said second fan and said second coil-end group.

8. An alternator for a vehicle as claimed in claim 1, wherein each of said conductor segments has a rectangular cross-section whose longer sides extend in the radial direction of said stator.

9. An alternator as claimed in claim 8, wherein one of shorter sides of said rectangular cross-section extends along the outer periphery of said stator.

10. An alternator as claimed in claim 8, wherein each of said U-turn portions inclines more parallel to the direction of said cooling air than said joint portions.

11. An alternator as claimed in claim 1, wherein said cooling fan member comprises one fan disposed adjacent said first coil-end group.

12. An alternator as claimed in claim 1, wherein said cooling fan member comprises one fan disposed adjacent said second coil-end group.

13. An alternator disposed near an internal combustion engine comprising:

a rotor having magnetic poles and a field coil, a cooling fan member, and a stator disposed around said rotor and having a stator core and a multi-phase stator winding, wherein said multi-phase stator winding comprises a plurality of conductor segments each having a U-turn portion to form a first coil-end group and a pair of joint portions to form a second coil-end group;

said first coil-end group is disposed on an end of said stator core so as to define a continuous cooling air passageway near said engine and said second coil-end group is disposed on the other end of said stator core so as to define a cooling air passageway in which said joint portions form interruptions to the flow of said cooling air; and said cooling fan member comprises a mixed-flow fan for sending cooling air to said second coil-end group and a centrifugal fan for sending cooling air to said first coil-end group.

14. An apparatus comprising:

an engine; and an alternator comprising:

a rotor having magnetic poles and a field coil;

a cooling fan member; and a stator disposed around said rotor and having a stator core and a multi-phase stator winding;

said multi-phase stator winding comprising a plurality of conductor segments each having a U-turn portion to form a first coil-end group and a pair of joint portions to form a second coil-end group;

said first coil-end group being disposed on an end of said stator core so as to define a continuous cooling air passageway and said second coil-end group being disposed on the other end so as to define a cooling air passageway in which said joint portions form interruptions to the flow of said cooling air; and said cooling fan member sending less cooling air to said second coil-end group than said first coil-end group;

wherein said engine is disposed adjacent said first coil-end group and away from said second coil-end group.

* * * * *